July 8, 1952    J. J. HOLODY    2,602,878
AUTOMOBILE HEATING AND VENTILATING APPARATUS
Filed July 26, 1951    2 SHEETS—SHEET 1

Inventor
John J. Holody
By J. Irving Silverman
Attorney

July 8, 1952           J. J. HOLODY           2,602,878
AUTOMOBILE HEATING AND VENTILATING APPARATUS
Filed July 26, 1951           2 SHEETS—SHEET 2
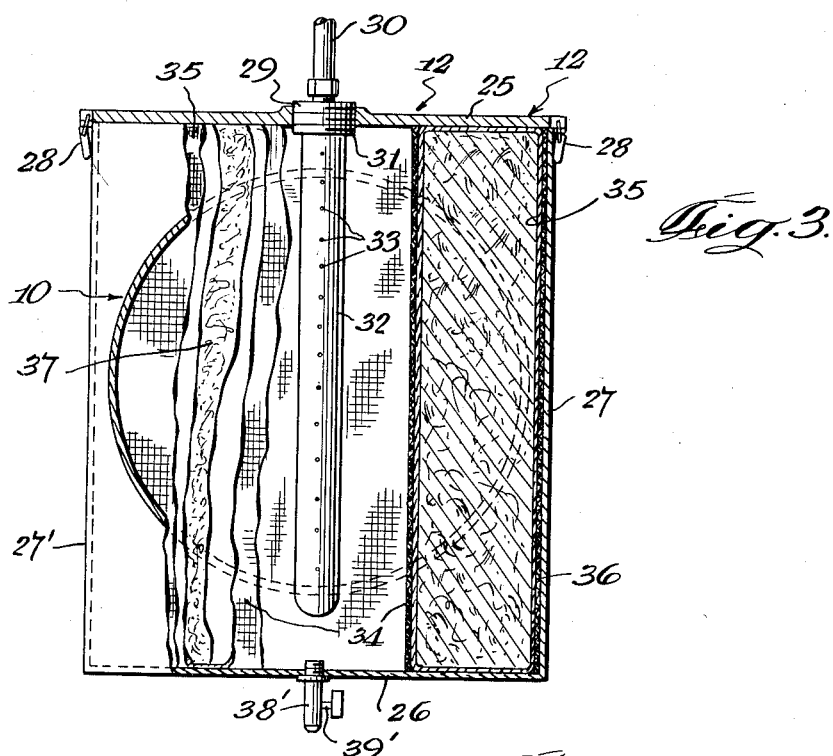
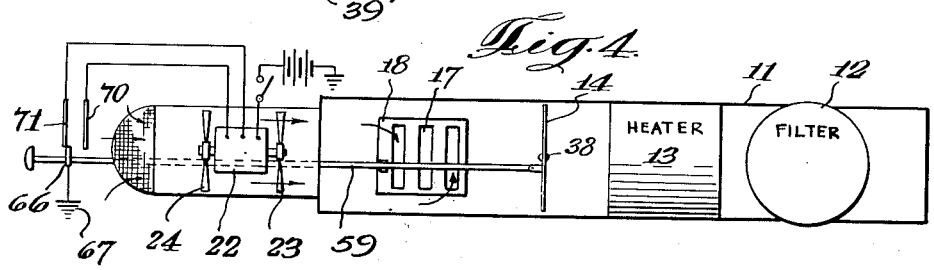
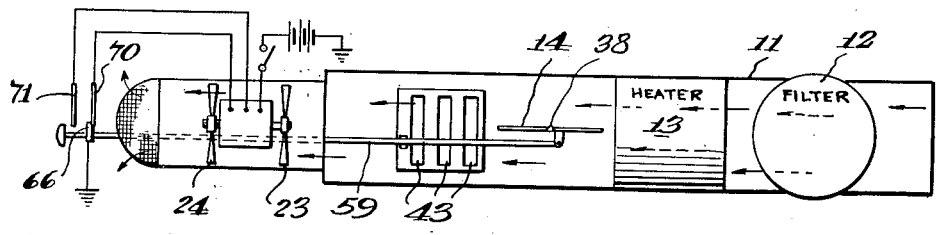
Inventor
John J. Holody
By J. Irving Silverman
Attorney

Patented July 8, 1952

2,602,878

UNITED STATES PATENT OFFICE 2,602,878

AUTOMOBILE HEATING AND VENTILATING APPARATUS

John J. Holody, Chicago, Ill.

Application July 26, 1951, Serial No. 238,751

13 Claims. (Cl. 219—39)

This invention is concerned generally with heating and ventilating apparatus and more particularly is concerned with providing an improved apparatus of the character described especially adapted for use in an automobile.

A principal object of the invention is to provide an improved heating and ventilating apparatus for automobiles adapted to filter and heat air being fed into the passenger compartment of the vehicle and to remove stale air from said compartment.

Another object of the invention is to provide heating and ventilating apparatus for automobiles having a novel valve system and means for operating said valves whereby to enable efficient and effective feeding of fresh air to and removal of stale air from the passenger compartment.

Another object of the invention is to provide heating and ventilating apparatus of the character described having an offset outlet thereon for ready and efficient removal of air from said passenger compartment.

Another object of the invention is to provide apparatus of the character described in which there is a simple unitary actuating mechanism for simultaneously controlling the operation of said apparatus and the positioning of the valves thereof whereby to enable efficient operation of the apparatus under all kinds of weather conditions.

An ancillary object of the invention is to provide apparatus of the character described in which is provided novel means for washing and filtering air to be admitted to the passenger compartment.

Other objects of the invention comprise the provision of apparatus of the character described which is fabricated of simple parts, is easy to install and maintain, is inexpensive to manufacture and thoroughly effective during its use.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 3 is a sectional view through the washing and filtering means taken along the line 3—3 of Fig. 1 and in the direction indicated.

Fig. 4 is a diagrammatic view of the system embodying the invention and showing the position of the valves when air is being removed from the passenger compartment.

Fig. 5 is a diagrammatic view of the system shown in Fig. 1 and showing the valves in position for admitting air into the passenger compartment.

Figure 1:
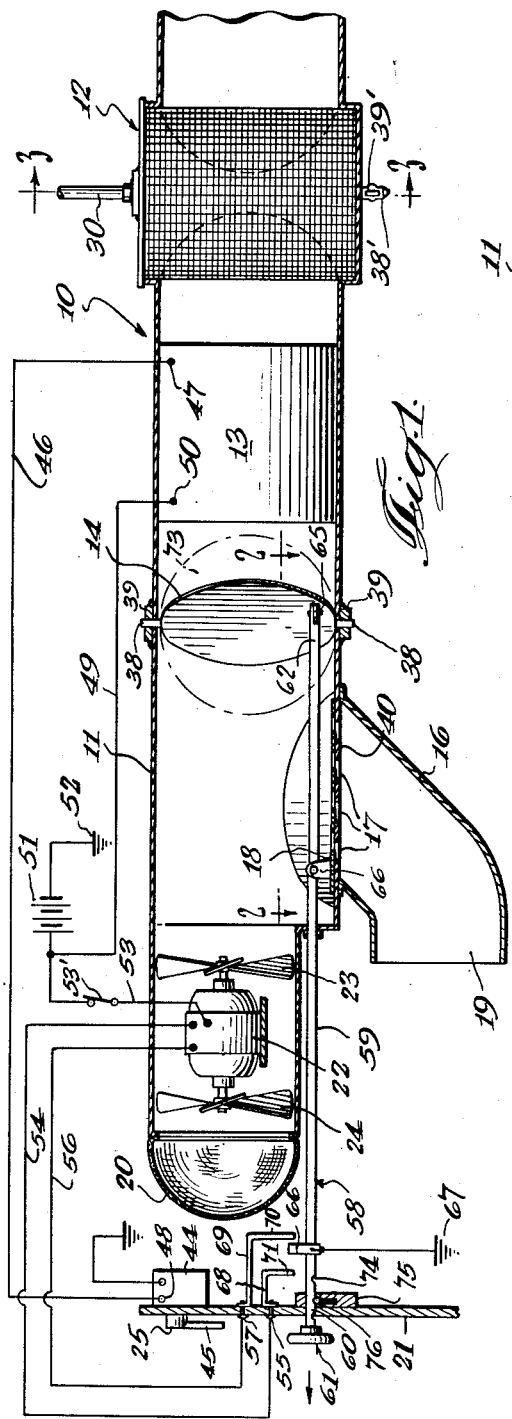
Fig. 1 is an elevational view of the heating and ventilating system embodying the invention with the conduit in section.

Referring to the drawings, the heating and ventilating apparatus embodying the invention is designated generally by the reference character 10. Same includes an elongate conduit 11 having an open end (not shown) which may be disposed in the air stream of the automobile radiator fan, the means for mounting said apparatus having not been described since any well known mounting means would suffice. In proximity to said open end is mounted my novel means for washing and filtering the air entering the conduit, said means being designated generally 12. Arranged behind the means 12 is an electrical heater 13, same being of conventional construction for heating air passing therethrough and hence is shown merely in block form in the drawings. Following the heater 13 is a valve 14 adapted to close off the area of the conduit. Immediately behind the valve 14 and arranged angularly with respect to the conduit is an offset pipe 16 communicating with said conduit through a plurality of spaced openings 17. Said openings 17 have associated therewith a slide valve 18 for opening and closing openings 17. The outer end 19 of the pipe may be arranged to project either from the sides of the hood or the fenders of the automobile. The opposite end 20 of said conduit is arranged adjacent the dashboard 21 in the passenger compartment and through which end stale air from said compartment may be removed. Mounted in the conduit 11 near said end 20 is a single reversing motor 22 which serves to drive a pair of fan blades 23 and 24. It will be understood that instead of a single reversing motor a pair of motors each driving a fan blade also would be suitable for accomplishing the objects of the invention. Electrical leads are provided for connecting the motor 22 to a manually operable switch 25 on the dashboard and the heater 13 also being connected through suitable electrical leads to said switch 25. A unitary actuating mechanism is operatively connected to the valve 14, valve 18, and motor 22 for simultaneously and cooperatively controlling the operation thereof for selectively feeding fresh air into passenger compartment or removing stale air therefrom.

Prior to specifically describing the various elements of the apparatus embodying the invention, it will be helpful in attaining a complete understanding thereof to show briefly the manner in which same operates. Air entering the conduit at the front thereof first passes through the washing and filtering means 12 where it is cleansed and freshened prior to being distributed to the passenger compartment. Upon leaving the means 12, the air passes through the heater 14 where same may be heated if weather conditions warrant. Should the operator desire to distribute said air to the passenger compartment, he may selectively operate the actuating mechanism to open the valve 14, close the valve 18 to the pipe 16, and start the motor 22 only to revolve the fan blade 23 in a direction for drawing air into the conduit 11. Closing the valve 18 thereby permits direct and continuous flow of fresh air into the passenger compartment through the end 20. Should the operator desire to evacuate stale air from the passenger compartment, he may operate the actuating mechanism to close the valve 14, open the valve 18 and start the motor 22 to rotate the fan blade 24 for drawing stale air from said compartment through the end 20. Air thus drawn from the compartment will be led into the conduit 11, through the openings 17 and out of the end 19 of the pipe 16. Since, during this operation the valve 14 is in closed position, air entering the conduit from the air stream of the radiator fan will not interfere with the removal of stale air from the passenger compartment through pipe 16. The various operations of the apparatus 10 are all accomplished selectively by manipulation of a single actuating mechanism within easy reach of the operator.

Referring to Figs. 1 and 3, there is shown the washing and filtering means 12. Same comprises a housing having a top wall 25, a bottom wall 26 and perforated side walls 27, 27' joined to said top walls by means of clamps 28 so that top wall 25 is removable. Mounted in the top wall 25 is a plug 29, there being a pipe 30 secured to the top thereof which connects with a tank (not shown) for supplying water to said means 12. On the opposite surface 31 of said plug and depending therefrom into the interior of the housing is a pipe 32, said pipe having a plurality of spaced openings 33 communicating with the interior thereof. On each side of said pipe 32 the interior of the housing is sectioned off by means of a pair of screens 34, 34 secured between the top wall 25 and bottom wall 26, thereby forming compartments 35 between said screens and the side walls 27.

Secured among the inside surfaces of the walls forming said compartments 35 is a sheet of fabric 36 and disposed therebetween is a massing of filtering material 37 which may consist of fibre glass or the like. In the bottom wall 26 is mounted a draining plug 38' connecting the interior of the housing with the exterior thereof. A valve 39' is available for opening and closing said drain plug. The air entering the housing through the side wall 27 passes through the filtering material 37 and is washed by the liquid sprayed from the pipe 32 through the openings 33 and then passed again through the other compartment 35 out through the wall 27' into the conduit 11. In this manner the air may be cleansed and freshened and moisture added thereto, especially when in hot, dry localities.

The valve 14 as shown in Fig. 1 consists of a circular plate mounted for rotation in the conduit 11 on a pair of stub shafts 38 mounted on brackets 39 on wall of the conduit diametrically opposite each other. Although the valve 14 is shown as a large member covering the area of the conduit 11, it will be appreciated that same be varied in size and form in any well known manner without circumventing the invention, such as providing a small valve mounted between a pair of brackets or wall sections protruding into the conduit from the outer wall thereof. It is intended merely to show a valve adapted for rotation in said conduit for opening and closing same.

The offset pipe 16 is positioned immediately behind the valve 14 as viewed from right to left in Fig. 1. The upper end of the pipe is provided with a plate 40, said plate having spaced openings 17. Mounted over the plate 40 is a slide valve 18 consisting of a plate 41 having formed therein a series of openings 42 separated by solid portions 43, the openings 42 and portions 43 arranged selectively to coincide with the openings 40. Thus, upon sliding of the plate 41, the openings 17 may be opened or closed respectively with the coincidence of the opening 42 and portions 43 therewith.

The electrical circuit for operating the motor 22 and heater 13 is simple and conventional. Same includes a central switch 44 operable through the member 45 from the inside of the compartment. A lead 46 connects one terminal 47 of the heater to terminal 48 of the switch and lead 49 connects terminal 50 of the heater to the source of power, which in this case is the ordinary automobile battery designated diagrammatically at 51. The short lead 52 connects the other end of the battery to ground 52. The lead 53 having the switch 53' therein is connected to the battery 51. One terminal of the motor is connected by means of lead 54 to a contact 55 on the dashboard and the other terminal is connected by lead 56 to the contact 57. The contacts 55 and 57 are electrically connected to the switch 48. By turning the member 45 selectively, the heater 13 may be turned on, or the motor 22 started either to rotate fan blade 23 or 24 as may be desired. It will be understood that by means of switch 53', the heater 13 may be operated independently of motor 22.

Figure 2:
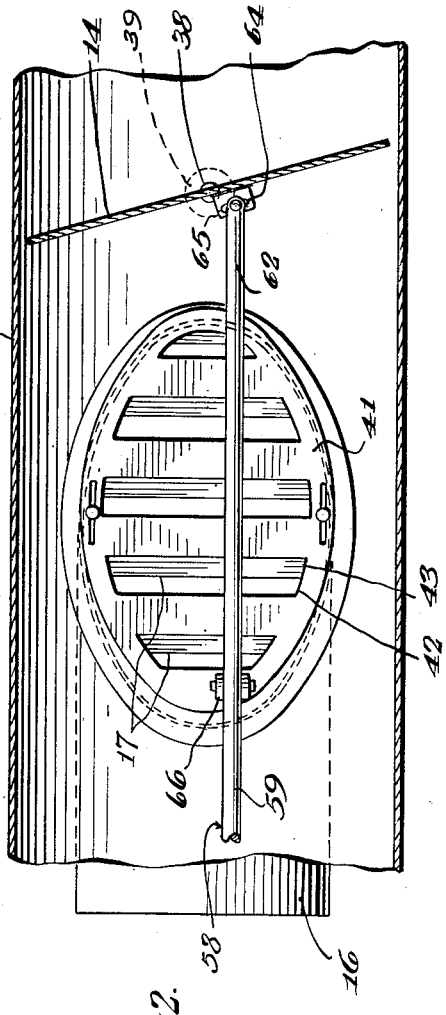
Fig. 2 is a sectional view taken along the line 2—2 of Fig. 1 and showing the valve construction and actuating mechanism forming part of the invention.

The actuating mechanism comprising an important feature of the apparatus is shown in Figs. 1 and 2 and is designated generally 58. Same comprises an elongate rod 59 having one end 60 movably mounted in the dashboard 21 and extending therethrough. On said end 60 is mounted a knob 61 by means of which the rod may be moved. The opposite end 62 of said rod is attached eccentrically to the plate 14, the end 62 being secured in a slot 64 provided in flange 65 extending perpendicularly from said plate 14.

Intermediate the ends 60 and 62, the rod is secured to the plate 41 in any well known manner such as indicated at 66. By pulling the knob 61 outward, the rod is moved carrying along therewith the plate 41 and tilting the valve 14 simultaneously.

On the end 60 of said rod is mounted a contact arm 66 which may be formed of resilient metal and extends outward therefrom, said arm 66 being electrically connected to ground shown at 67. Connected to the contact 55 is an L-shaped bracket 68 and connected to contact 57 is a similar bracket 69. Each of said brackets has an arm 70 and 71 which is disposed over the rod 59 in position to engage the contact arm 66. Said arms 70 and 71 are spaced from each other in a manner to permit selective engagement thereof by the arm 66.

The construction of the actuating mechanism 58 is such as to start the motor 22 and move the valves 14 and 18 either for admitting fresh air to the passenger compartment or for removing stale air from the same. Consider operation of the apparatus 10 during the former. In Figs. 1 and 5, the position of the arm 66 may be considered as being moved to engage the arm 70, which is done by pushing inwardly on the knob 61. The rod 59 will be moved to the right as shown in said Fig. 1 and thereby slide the plate 41 to the right so that the portions 43 thereof will cover the openings 17 completely. At the same time, the plate 14 will be tilted or rotated to the position shown by broken-line 73 in Fig. 1 or as shown in Fig. 5, which is its open position. When the arm 66 contacts the arm 70, the valve 14 will be open while the valve 18 will be closed, and contact between these arms will start the motor 22 to rotate the fan blade 23. Rotation of blade 23 is in a direction causing air to be drawn into the conduit 11. It will be seen that in this operation, with the valve 18 closed, air entering the conduit 11 is passed directly through the same out of the end 20 thereof and into the passenger compartment.

To evacuate stale air from the passenger compartment, the knob 61 is moved to an indicated position (such as by indicia which may be provided on the dashboard, same being well-known in the art) for this operation as shown in Fig. 4. In moving the knob 61 to this position, the rod 59 will be moved therealong closing the valve 14 and opening the valve 18. When the arm 66 contacts the arm 71, valve 14 will be closed and valve 18 will be open and the motor will be started to drive the fan blade 24. The blade 24 is arranged to rotate in a direction for drawing air from the passenger compartment and the air so drawn will be directed through the end 20 to the pipe 16 and out the end 19. The air which may be entering the conduit from the air stream of the radiator fan will be prevented from interfering with the evacuation of stale air from the compartment through pipe 16 by the closed valve 14.

There may be provided on the end 60 of the rod 59 means for maintaining said rod in contact position as selected by the operator. Such means may consist of a series of notches 74, each notch positioning the rod 59 in a position to carry out one of the above mentioned operations of the apparatus 10. I may provide a detent mechanism designated generally 75 mounted on rod 59 which comprises a spring-pressed ball 76 adapted to engage within one of such notches at a time for keeping the rod immobile.

It will be apparent that I have provided a simple, inexpensive heating and ventilating apparatus capable of effectively admitting fresh air to and evacuating stale air from passenger compartments of automobiles, which objectives may be controlled by the operator by manipulation of a single actuating mechanism. It is believed that further description of the construction thereof will not be necessary. It is desired to point out that various modifications, changes in form and size and mode of operation may occur to those skilled in the art without departing from the spirit and substance of the invention, the scope of which is defined in the appended claims.

I claim:

1. Heating and ventilating apparatus of the character described and having a conduit open at one end for receiving air therein and communicating at its opposite end with the passenger compartment of an automobile, including means adjacent said open end for filtering and washing air entering said conduit, electrical heating means in said conduit, a motor for rotating a fan blade in a direction for drawing air into the conduit through said open end and for rotating a fan blade in a direction for drawing air into said conduit from the compartment, outlet means offset from the conduit and having openings communicating therewith whereby to permit air drawn from said compartment to be passed therethrough, valve means for opening and closing said openings, a second valve disposed between said outlet means and said heating means in the conduit, and an actuating mechanism for selectively controlling operation of said motor, valve means and second valve whereby when effecting rotation of said first mentioned blade, said second valve will be open and said valve means closed and when effecting rotation of said second mentioned blade, the reverse positioning of the respective valves will be obtained.

2. Heating and ventilating apparatus of the character described and having a conduit open at one end for receiving air therein and communicating at its opposite end with the passenger compartment of an automobile, including means adjacent said open end for filtering and washing air entering said conduit, electrical heating means in said conduit, a motor for rotating a fan blade in a direction for drawing air into the conduit through said open end and for rotating a fan blade in a direction for drawing air into said conduit from the compartment, outlet means offset from the conduit and having openings communicating therewith whereby to permit air drawn from said compartment to be passed therethrough, valve means for opening and closing said openings, a second valve disposed between said outlet means and said heating means in the conduit, and an actuating mechanism for selectively controlling operation of said motor, valve means and second valve whereby when effecting rotation of said first mentioned blade, said second valve will be open and said valve means closed and when effecting rotation of said second mentioned blade, the reverse positioning of the respective valves will be obtained, said valve means comprising a plate member rotatably mounted in the conduit and said second valve comprising a slidable plate member having openings and solid portions spaced thereon adapted selectively to be arranged in coincidence with the openings of said outlet means, said plate members having said actuating mechanism thereto secured.

3. Heating and ventilating apparatus of the character described and having a conduit open at one end for receiving air therein and communicating at its opposite end with the passenger compartment of an automobile, including means adjacent said open end for filtering and washing air entering said conduit, electrical heating means in said conduit, a motor for rotating a fan blade in a direction for drawing air into the conduit through said open end and for rotating a fan blade in a direction for drawing air into said conduit from the compartment, outlet means offset from the conduit and having openings communicating therewith whereby to permit air drawn from said compartment to be passed therethrough, valve means for opening and closing said openings, a second valve disposed between said outlet means and said heating means in the conduit, and an actuating mechanism for selectively controlling operation of said motor, valve means and second valve whereby when effecting rotation of said first mentioned blade, said second valve will be open and said valve means closed and when effecting rotation of said second mentioned blade, the reverse positioning of the respective valves will be obtained, said outlet means comprising a pipe member secured to said conduit positioned between the motor and said heating means for leading air drawn from the passenger compartment to a point exterior of said conduit.

4. Heating and ventilating apparatus of the character described and having a conduit open at one end for receiving air therein and communicating at its opposite end with the passenger compartment of an automobile, including means adjacent said open end for filtering and washing air entering said conduit, electrical heating means in said conduit, a motor for rotating a fan blade in a direction for drawing air into the conduit through said open end and for rotating a fan blade in a direction for drawing air into said conduit from the compartment, outlet means offset from the conduit and having openings communicating therewith whereby to permit air drawn from said compartment to be passed therethrough, valve means for opening and closing said openings, a second valve disposed between said outlet means and said heating means in the conduit, and an actuating mechanism for selectively controlling operation of said motor, valve means and second valve whereby when effecting rotation of said first mentioned blade, said second valve will be open and said valve means closed and when effecting rotation of said second mentioned blade, the reverse positioning of the respective valves will be obtained, said mechanism comprising an elongate rod operatively joined to said valve means and said second valve and having a contact arm thereon for selectively energizing said motor whereby to cause rotation of said fan blades individually for drawing air into the conduit or from said compartment.

5. In heating and ventilating apparatus for automobiles having an elongate conduit communicating at one end with the passenger compartment and its other end being open for receiving air therein and electrical heating means in said conduit and a motor for selectively rotating a fan blade in a direction for drawing air through said open end and another blade for drawing stale air into the conduit from said compartment, outlet means secured to said conduit and having openings in one end communicating with said conduit, a valve in said outlet opening and closing said openings, a valve in said conduit for opening and closing same, and unitary actuating mechanism operatively secured to each of said valves and having a contact arm for energizing said motor selectively to rotate said blades.

6. In heating and ventilating apparatus for automobiles having an elongate conduit communicating at one end with the passenger compartment and its other end being open for receiving air therein and electrical heating means in said conduit and a motor for selectively rotating a fan blade in a direction for drawing air through said open end and another blade for drawing stale air into the conduit from said compartment, outlet means secured to said conduit and having openings in one end communicating with said conduit, a valve in said outlet opening and closing said openings, a valve in said conduit for opening and closing same, and unitary actuating mechanism operatively secured to each of said valves and having a contact arm for energizing said motor selectively to rotate said blades, said motor being electrically connected to a pair of contacts, each contact respectively adapted to be engaged by said contact arm whereby said engagement will result in rotation of one of said blades.

7. In heating and ventilating apparatus for automobiles having an elongate conduit communicating at one end with the passenger compartment and its other end being open for receiving air therein and electrical heating means in said conduit and a motor for selectively rotating a fan blade in a direction for drawing air through said open end and another blade for drawing stale air into the conduit from said compartment, outlet means secured to said conduit and having openings in one end communicating with said conduit, a valve in said outlet opening and closing said openings, a valve in said conduit for opening and closing same, and unitary actuating mechanism operatively secured to each of said valves and having a contact arm for energizing said motor selectively to rotate said blades, said motor being electrically connected to a pair of contacts, each contact respectively adapted to be engaged by said contact arm whereby said engagement will result in rotation of one of said blades, and said mechanism adapted to close said first mentioned valve and open said second mentioned valve when said first mentioned blade is rotated and reverse the position of said valves when said second mentioned blade is rotated.

8. In heating and ventilating apparatus for automobiles having an elongate conduit communicating at one end with the passenger compartment and its other end being open for receiving air therein and electrical heating means in said conduit and a motor for selectively rotating a fan blade in a direction for drawing air through said open end and another blade for drawing stale air into the conduit from said compartment, outlet means secured to said conduit and having openings in one end communicating with said conduit, a valve in said outlet opening and closing said openings, a valve in said conduit for opening and closing same, and unitary actuating mechanism operatively secured to each of said valves and having a contact arm for energizing said motor selectively to rotate said blades, said outlet means comprising a pipe secured to said conduit and arranged angularly with respect thereto, the second end of which opens at a point removed from said conduit.

9. In heating and ventilating apparatus for automobiles having an elongate conduit communicating at one end with the passenger compartment and its other end being open for receiving air therein and electrical heating means in said conduit and a motor for selectively rotating a fan blade in a direction for drawing air through said open end and another blade for drawing stale air into the conduit from said compartment, outlet means secured to said conduit and having openings in one end communicating with said conduit, a valve in said outlet opening and closing said openings, a valve in said conduit for opening and closing same, and unitary actuating mechanism operatively secured to each of said valves and having a contact arm for energizing said motor selectively to rotate said blades, said outlet means comprising a pipe secured to said conduit and arranged angularly with respect thereto, the second end of which opens at a point removed from said conduit, said second mentioned valve comprising a slidable plate member having alternately spaced openings and solid portions each of which respectively is adapted to be arranged in alignment with the openings in said pipe whereby to effect opening and closing thereof.

10. In heating and ventilating apparatus for automobiles having an elongate conduit communicating at one end with the passenger compartment and its other end being open for receiving air therein and electrical heating means in said conduit and a motor for selectively rotating a fan blade in a direction for drawing air through said open end and another blade for drawing stale air into the conduit from said compartment, outlet means secured to said conduit and having openings in one end communicating with said conduit, a valve in said outlet opening and closing said openings, a valve in said conduit for opening and closing same, and unitary actuating mechanism operatively secured to each of said valves and having a contact arm for energizing said motor selectively to rotate said blades, said motor being electrically connected to a pair of contacts, each contact respectively adapted to be engaged by said contact arm whereby said engagement will result in rotation of one of said blades, and said mechanism adapted to close said first mentioned valve and open said second mentioned valve when said first mentioned blade is rotated and reverse the position of said valves when said second mentioned blade is rotated, and detent means on said mechanism for maintaining same immovable after engagement of said contact arm with one of said contacts.

11. Apparatus for heating and ventilating an automobile comprising a conduit communicating at one end with the passenger compartment of the automobile and having its opposite end disposed to receive air from outside of the automobile, electrical heating means in said conduit, a motor in said conduit including a pair of fan blades adapted to be rotated individually in opposite directions, an offset pipe secured to said conduit and communicating at one end thereof with the conduit, a butterfly valve mounted in the conduit, a slide valve associated with the pipe for opening and closing said end, and an elongate actuating rod movable in said conduit to a plurality of positions and secured to each of said valves, said rod having an electrical contact arm adapted to engage the contacts of said motor, movement of said rod to one position resulting in the closing of said butterfly valve and opening of said slide valve and rotation of one blade in a direction for drawing air into said conduit from said compartment and through said pipe, and a second position thereof resulting in closing of said slide valve and opening of said butterfly valve and rotation of the second blade in a direction for drawing air into said open end for admittance to said compartment.

12. Apparatus for heating and ventilating an automobile comprising a conduit communicating at one end with the passenger compartment of the automobile and having its opposite end disposed to receive air from outside of the automobile, electrical heating means in said conduit, a motor in said conduit including a pair of fan blades adapted to be rotated individually in opposite directions, an offset pipe secured to said conduit and communicating at one end thereof with the conduit, a butterfly valve mounted in the conduit, a slide valve associated with the pipe for opening and closing said end, and an elongate actuating rod movable in said conduit to a plurality of positions and secured to each of said valves, said rod having an electrical contact arm adapted to engage the contacts of said motor, movement of said rod to one position resulting in the closing of said butterfly valve and opening of said slide valve and rotation of one blade in a direction for drawing air into said conduit from said compartment and through said pipe, and a second position thereof resulting in closing of said slide valve and opening of said butterfly valve and rotation of the second blade in a direction for drawing air into said open end for admittance to said compartment, and filtering and washing means in said conduit disposed near said open end for freshening air entering thereinto.

13. Apparatus for heating and ventilating an automobile comprising a conduit communicating at one end with the passenger compartment of the automobile and having its opposite end disposed to receive air from outside of the automobile, electrical heating means in said conduit, a motor in said conduit including a pair of fan blades adapted to be rotated individually in opposite directions, an offset pipe secured to said conduit and communicating at one end thereof with the conduit, a butterfly valve mounted in the conduit, a slide valve associated with the pipe for opening and closing said end, and an elongate actuating rod movable in said conduit to a plurality of positions and secured to each of said valves, said rod having an electrical contact arm adapted to engage the contacts of said motor, movement of said rod to one position resulting in the closing of said butterfly valve and opening of said slide valve and rotation of one blade in a direction for drawing air into said conduit from said compartment and through said pipe, and a second position thereof resulting in closing of said slide valve and opening of said butterfly valve and rotation of the second blade in a direction for drawing air into said open end for admittance to said compartment, and filtering and washing means in said conduit disposed near said open end for freshening air entering thereinto, comprising a housing having perforated side walls for permitting air to pass therethrough, compartments formed in said housing having filtering material therein and adapted to receive therein air through said perforations, means connecting said housing to a supply of water including a perforated pipe disposed within said housing whereby air received therein may be washed by said water emitted by said pipe and drainage means on said housing for draining off said water to a point exterior of the housing.

JOHN J. HOLODY.

REFERENCES CITED

The following references are of record in the file of this patent:

UNITED STATES PATENTS

| Number | Name | Date |
|---|---|---|
| 1,676,021 | Gould | July 3, 1928 |
| 2,200,098 | Pilley | May 7, 1940 |